US008166115B2

(12) United States Patent
Krause et al.

(10) Patent No.: US 8,166,115 B2
(45) Date of Patent: Apr. 24, 2012

(54) SYSTEMS AND METHODS FOR ELECTRONIC MESSAGE CONTENT IDENTIFICATION

(75) Inventors: Robert G. Krause, Severna, MD (US); Wayne H. Orbke, Germantown, TN (US)

(73) Assignee: United States Postal Service, Washington, DC (US)

(*) Notice: Subject to any disclaimer, the term of this patent is extended or adjusted under 35 U.S.C. 154(b) by 103 days.

(21) Appl. No.: 11/656,416

(22) Filed: Jan. 23, 2007

(65) Prior Publication Data
US 2007/0150533 A1    Jun. 28, 2007

Related U.S. Application Data

(62) Division of application No. 10/311,743, filed on Dec. 19, 2002.

(60) Provisional application No. 60/212,670, filed on Jun. 20, 2000.

(51) Int. Cl.
*G06F 15/16* (2006.01)
(52) U.S. Cl. ...................................................... 709/206
(58) Field of Classification Search ........... 709/204–207
See application file for complete search history.

(56) References Cited

U.S. PATENT DOCUMENTS

| | | | |
|---|---|---|---|
| 4,135,662 A | 1/1979 | Dlugos | |
| 4,309,569 A | 1/1982 | Merkle | |
| 4,574,352 A | 3/1986 | Coppola et al. | |
| 4,725,718 A | 2/1988 | Sansone et al. | |
| 4,727,368 A | 2/1988 | Larson et al. | |
| 5,043,908 A | 8/1991 | Manduley et al. | |
| 5,136,646 A | 8/1992 | Haber et al. | |
| 5,136,647 A | 8/1992 | Haber et al. | |
| 5,223,829 A | 6/1993 | Watabe | |
| 5,373,561 A | 12/1994 | Haber et al. | |
| 5,404,231 A | 4/1995 | Bloomfield | |
| RE34,954 E | 5/1995 | Haber et al. | |
| 5,638,446 A | 6/1997 | Rubin | |
| 5,701,770 A | 12/1997 | Cook et al. | |
| 5,710,887 A | 1/1998 | Chelliah et al. | |
| 5,774,053 A | 6/1998 | Porter | |

(Continued)

FOREIGN PATENT DOCUMENTS

EP    0 516 898 A1    12/1992
(Continued)

OTHER PUBLICATIONS

Bachmann, et al. "Implementing LDAP Search Queries with SQL", 1998, IBM.*
(Continued)

*Primary Examiner* — Dohm Chankong
*Assistant Examiner* — Julian Chang
(74) *Attorney, Agent, or Firm* — Finnegan, Henderson, Farabow, Garrett & Dunner, LLP

(57) ABSTRACT

An electronic message identification method and system is provided for identifying and managing electronic messages. The electronic message identification method and system may be used for sending an electronic file to a customer by receiving an approval from the customer indicating acceptable content for electronic files that are sent to the customer; receiving the electronic file from a sender, the electronic file including file content and a message content identifier corresponding to the file content; comparing the message content identifier to the approval from the customer; and delivering the file content to an electronic mailbox of the customer, if the message content identifier is consistent with the approval from the customer indicating acceptable content.

18 Claims, 6 Drawing Sheets

U.S. PATENT DOCUMENTS

| | | | |
|---|---|---|---|
| 5,781,629 | A | 7/1998 | Haber et al. |
| 5,857,188 | A | 1/1999 | Douglas |
| 5,870,549 | A | 2/1999 | Bobo |
| 5,878,233 | A | 3/1999 | Schloss |
| 5,917,411 | A | 6/1999 | Baggarly |
| 5,917,925 | A | 6/1999 | Moore |
| 5,943,656 | A | 8/1999 | Crooks et al. |
| 5,971,587 | A | 10/1999 | Kato et al. |
| 5,979,750 | A | 11/1999 | Kindell |
| 6,006,200 | A | 12/1999 | Boies et al. |
| 6,028,517 | A | 2/2000 | Sansone et al. |
| 6,035,402 | A | 3/2000 | Vaeth et al. |
| 6,047,264 | A | 4/2000 | Fisher et al. |
| 6,064,995 | A | 5/2000 | Sansone et al. |
| 6,131,101 | A * | 10/2000 | Maitino et al. ............ 1/1 |
| 6,138,910 | A | 10/2000 | Madruga |
| 6,152,369 | A | 11/2000 | Wilz et al. |
| 6,219,669 | B1 | 4/2001 | Haff et al. |
| 6,233,565 | B1 | 5/2001 | Lewis et al. |
| 6,243,620 | B1 | 6/2001 | Robinson et al. |
| 6,246,925 | B1 | 6/2001 | Robinson et al. |
| 6,259,964 | B1 | 7/2001 | Robinson |
| 6,285,991 | B1 | 9/2001 | Powar |
| 6,289,323 | B1 | 9/2001 | Gordon et al. |
| 6,323,782 | B1 | 11/2001 | Stephens et al. |
| 6,339,795 | B1 * | 1/2002 | Narurkar et al. ............ 709/246 |
| 6,347,737 | B1 | 2/2002 | Madruga |
| 6,442,571 | B1 | 8/2002 | Haff et al. |
| 6,460,050 | B1 | 10/2002 | Pace et al. |
| 6,487,538 | B1 * | 11/2002 | Gupta et al. ............ 705/14.66 |
| 6,651,063 | B1 * | 11/2003 | Vorobiev ............ 707/10 |
| 7,346,591 | B2 | 3/2008 | Sansone ............ 705/410 |
| 7,437,414 | B2 * | 10/2008 | Dean ............ 709/206 |
| 2001/0020235 | A1 * | 9/2001 | Game ............ 707/1 |
| 2001/0032115 | A1 | 10/2001 | Goldstein |
| 2001/0032181 | A1 | 10/2001 | Jakstadt et al. |
| 2002/0002590 | A1 * | 1/2002 | King et al. ............ 709/206 |
| 2002/0032597 | A1 | 3/2002 | Chanos |
| 2002/0049672 | A1 | 4/2002 | Kitchen et al. |
| 2002/0143462 | A1 * | 10/2002 | Warren ............ 701/200 |
| 2002/0188689 | A1 * | 12/2002 | Michael ............ 709/206 |
| 2002/0198791 | A1 * | 12/2002 | Perkowski ............ 705/26 |
| 2003/0077409 | A1 | 4/2003 | Schnell |

FOREIGN PATENT DOCUMENTS

| | | |
|---|---|---|
| WO | WO 97/12460 | 4/1997 |
| WO | WO 00/13368 | 3/2000 |
| WO | WO 01/00069 A2 | 1/2001 |
| WO | WO 01/18718 A1 | 3/2001 |
| WO | WO 01/65444 A1 | 9/2001 |
| WO | WO 01/99005 A1 | 12/2001 |
| WO | WO 01/99037 A1 | 12/2001 |
| WO | WO 02/08961 A1 | 1/2002 |
| WO | WO 02/21315 A1 | 3/2002 |
| WO | WO 0233604 A2 * | 4/2002 |
| WO | WO 02/066344 A1 | 8/2002 |
| WO | WO 02/079947 A2 | 10/2002 |
| WO | WO 03/023677 A1 | 3/2003 |

OTHER PUBLICATIONS

Samoriski, Jan H. "Unsolicited Commercial E-mail, the Internet and the First Amendment: Another Free Speech Showdown in Cyberspace?", 1999 Broadcast Education Association, Journal of Broadcasting & Electronic Media, pp. 670-689.*

Campbell et al., "Systems and Methods for Authenticating an Electronic Message," Pending U.S. Appl. No. 09/675,667, filed Sep. 29, 2000.

Campbell et al., "Methods and Systems for Proofing Identities Using a Certificate Authority," Pending U.S. Appl. No. 09/809,325, filed Mar. 16, 2001.

Orbke et al., "Methods and Systems for Establishing an Electronic Account for a Customer," Pending U.S. Appl. No. 09/809,328, filed Mar. 16, 2001.

Cook et al., "Methods and Systems for Providing a Secure Electronic Mailbox," Pending U.S. Appl. No. 09/809,312, filed Mar. 16, 2001.

Campbell et al., "Methods and Systems for Providing an Electronic Account to a Customer," Pending U.S. Appl. No. 09/809,581, filed Mar. 16, 2001.

Cook et al., "Methods and Systems for Linking an Electronic Address to a Physical Address of a Customer," Pending U.S. Appl. No. 09/809,326, filed Mar. 16, 2001.

Estes et al., "System, Method, and Article of Manufacturing for Shipping a Package Privately to a Customer," Pending U.S. Appl. No. 10/311,748, corresponding to international application No. PCT/US01/19384, international filing date: Jun. 19, 2001 (specification provided as WO 01/99005 A1).

Buie et al., "Systems and Methods for Providing Mail Item Retrieval," Pending U.S. Appl. No. 10/311,742, corresponding to international application No. PCT/US01/19421, international filing date: Jun. 19, 2001 (specification provided as WO 01/99037 A1).

Sadler et al., "Item Attribute Preverification," Pending U.S. Appl. No. 10/333,841, corresponding to international application No. PCT/US01/23177, international filing date: Jul. 24, 2001 (specification provided as WO 02/08961 A1).

Campbell, "Systems and Methods for Providing Electronic Archiving," Pending U.S. Appl. No. 10/362,506, corresponding to international application No. PCT/US01/27690, international filing date: Sep. 7, 2001 (specification provided as WO 02/21315 A1).

Aldstadt, "Item Tracking and Anticipated Delivery Confirmation System Method," Pending U.S. Appl. No. 10/488,762, corresponding to international application No. PCT/US01/28001, international filing date: Sep. 7, 2001 (specification provided as WO 03/023677 A1).

Devar, "Universal Delivery and Collection Box Unit (UDCBU)," Pending U.S. Appl. No. 10/468,364, corresponding to international application No. PCT/US02/04866, international filing date: Feb. 20, 2002 (specification provided as WO 02/066344 A1).

Devar, "Universal Delivery and Collection Box Unit," Pending U.S. Appl. No. 10/473,873, corresponding to international application No. PCT/US02/09870, international filing date: Apr. 2, 2002 (specification provided as WO 02/079947 A2).

International Search Report, PCT/US00/27068, mailed May 4, 2001 (4 pages).

International Search Report in PCT/US01/23177, mailed Oct. 18, 2001 (4 pages).

International Search Report in PCT/US01/19384, mailed Nov. 16, 2001 (6 pages).

International Search Report in PCT/US01/19421, mailed Nov. 19, 2001 (6 pages).

International Search Report in PCT/US01/27690, mailed Nov. 19, 2001 (5 pages).

International Search Report in PCT/US01/28001, mailed Dec. 21, 2001 (7 pages).

International Search Report in PCT/US01/08490, mailed Jan. 22, 2002 (6 pages).

International Search Report in PCT/US02/04866, mailed May 23, 2002 (1 page).

International Search Report in PCT/US02/09870, mailed Dec. 5, 2002 (2 pages).

International Preliminary Examination Report in PCT/US01/08487, mailed Jan. 23, 2002 (4 pages).

International Preliminary Examination Report in PCT/US01/23177, mailed May 3, 2002 (4 pages).

International Preliminary Examination Report in PCT/US01/19421, mailed May 16, 2002 (4 pages).

International Preliminary Examination Report in PCT/US01/19384, mailed Jan. 17, 2003 (4 pages).

International Preliminary Examination Report in PCT/US01/08488, mailed Jun. 11, 2003 (10 pages).

International Preliminary Examination Report in PCT/US01/28001, mailed Aug. 8, 2003 (4 pages).

PCT Written Opinion (PCT Rule 66) in PCT/US01/19384, mailed Jun. 17, 2002 (4 pages).

PCT Written Opinion (PCT Rule 66) in PCT/US01/08488, mailed Oct. 28, 2002 (9 pages).

PCT Written Opinion (PCT Rule 66) in PCT/US02/09870, mailed Mar. 6, 2003 (5 pages).

PCT Written Opinion (PCT Rule 66) in PCT/US02/04866, mailed May 23, 2003 (4 pages).

Appendix K (USPS Burke Test Site Report), "User Interface Review of Mail Item Retrieval System (MIRS), Burke Station, Burke Virginia" (Dec. 24, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).

Appendix L, "In-plant Test Report (Re-Test Failed Items), Mail Item Retrieval System (MIRS)" (Oct. 21, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into U.S. Appl. No. 10/311,742, filed Dec. 19, 2002).

Appendix M, "Heuristic Evaluation of the USPS Mail Item Retrieval System Early Prototype," by R. Hoffman and E. Nelson, Mitretek Systems (May 11, 1998); appendix of USPS Mail Item Retrieval System (MIRS) Phase 2 Limited Production Self-Service Statement of Work (SOW) (SOW can be found in U.S. Appl. No. 60/255,407, filed Dec. 15, 2000, which is incorporated by reference into Pending U.S. Appl. No. 10/311,742, filed Dec. 19, 2002).

Bartholomew, D., "The Future of Snail Mail: the Postal Service is Gearing up for Competition. But Can it Deliver?," InformationWeek, Dec. 4, 1995, starting p. 34, retrieved from DIALOG, DIALOG No. 08306634 (6 pages).

Bhushan, B. et al., "Federated Accounting: Service Charging and Billing in a Business-to-Business Environment," 2001 IEEE/IFIP International Symposium, May 14-18, 2001, pp. 107-121.

"CONNECT announces OneServer interactive online application platform," Business Wire, Apr. 10, 1995, p. 4101043, retrieved from DIALOG, DIALOG No. 07797909 (2 pages).

Czerny, M., "Customer Account Management System for STEWEAG Key Accounts," CIRED 97 Conference Publication No. 438, Jun. 2-5, 1997, pp. 5.6.1 to 5.6.5.

eBusiness Tools, FedEx® Ship Manager Software [online], pp. 1-2, FedEx® [retrieved on Nov. 28, 2001]. Retrieved from the Internet: <URL: www.fedex.com/us/ebusiness/eshipping/ship.html>.

Fast Facts, Back Issue [online], pp. 1-4, FedEx® Oct. 11, 2000 [retrieved on Nov. 28, 2001]. Retrieved from the Internet: <URL: www.fedex.com/us/customer/fastfacts/backissues/101100fastfacts.html>.

"Joint Direct Bill Payment Form for Mich. Utilities," Bank Technology News, Apr. 1994, p. 8, retrieved from DIALOG, DIALOG No. 03302326 (1 page).

Newkirk, K.M., "Banks Can Slice Transaction Costs," Independent Banker, Dec. 1995, vol. 45, No. 12, pp. 52-53, retrieved from DIALOG, DIALOG No. 00276769 (3 pages).

Selected pages (9-11, 18-19, 28-32) from "Recommendation F.400/X.400 Message Handling and Directory Services—Operation and Definition of Service," Nov. 14, 1988, CCITT, Melbourne, XP002186347 (10 pages).

Stafford, C.D. et al., "Delivering Marketing Expertise to the Front Lines," IEEE Expert, Apr. 1994, pp. 23-32.

Office Action mailed Oct. 13, 2009 in corresponding U.S. Appl. No. 10/311,743.

Office Action mailed Feb. 1, 2010 in corresponding U.S. Appl. No. 10/311,743 (14 pages).

Office Action dated May 17, 2010 in co-pending U.S. Appl. No. 10/311,743 (14 pages).

Final Office Action dated Aug. 25, 2010, issued in co-pending U.S. Appl. No. 10/311,743 (16 pages).

Office Action dated Dec. 6, 2010, issued in co-pending U.S. Appl. No. 10/311,743 (14 pages).

Office Action issued Mar. 29, 2011 in co-pending U.S. Appl. No. 10/311,743 (14 pages).

Forta, Ben; "Sams Teach Yourself SQL in 10 Minutes;" 1999; Sams Publishing; pp. 12-15.

* cited by examiner

SYSTEMS AND METHODS FOR ELECTRONIC MESSAGE CONTENT IDENTIFICATION

RELATED APPLICATIONS

This is a divisional patent application of U.S. patent application Ser. No. 10/311,743, entitled "Systems and Methods for Electronic Message Content Identification," filed Dec. 19, 2002 by Robert G. Krause et al., which application is hereby expressly incorporated by reference.

Under provisions of 35 U.S.C. §119(e), the Applicant claims the benefit of U.S. provisional application Ser. No. 60/212,670, filed Jun. 20, 2000, which is hereby expressly incorporated by reference.

TECHNICAL FIELD

The present invention relates to electronic message transmission. More particularly, the present invention, in various specific embodiments, involves methods and systems directed to identifying electronic messages based on a message content identifier or participant code.

BACKGROUND

The United States Postal Service (USPS) is an independent government agency that provides mail delivery and other services to the public. The USPS is widely recognized as a safe and reliable means for sending and receiving physical mail and other items. The USPS also provides electronic mail service. With the advent and steady growth of electronic mail (e-mail) and electronic commerce, e-mail recipients may be constantly bombarded with increasing numbers of electronic messages.

Once an e-mail recipient's address is disclosed, it is possible for the recipient to receive large number of unwanted electronic messages, such as solicitations for all types of e-commerce products. The e-mail recipient's e-mail address may be disclosed by an Internet service provider or by any third party to which the e-mail recipient has sent an electronic message. to decide whether to delete or save the electronic messages once they are received. This tedious process leads to cluttered electronic mailboxes and a resulting loss of time for the e-mail recipient, as the recipient attempts to manage the e-mails within the electronic mailbox. Other existing methods are similarly undesirable.

Thus, there remains a need for efficiently identifying e-mail messages before they are delivered to an e-mail recipient's electronic mailbox, thereby eliminating the clutter of unwanted e-mail messages and the lost of time managing the e-mail messages within the electronic mailbox.

SUMMARY OF THE INVENTION

Consistent with the present invention, an electronic message identification method and system is provided that avoids the problems associated with current systems and methods for identifying and managing electronic messages.

In one aspect, a method consistent with the present invention for sending an electronic file to a customer comprises receiving an approval from the customer indicating acceptable content for electronic files that are sent to the customer; receiving the electronic file from a sender, the electronic file including file content and a message content identifier corresponding to the file content; comparing the message content identifier to the approval from the customer; and delivering the file content to an electronic mailbox of the customer, if the message content identifier is consistent with the approval from the customer indicating acceptable content.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
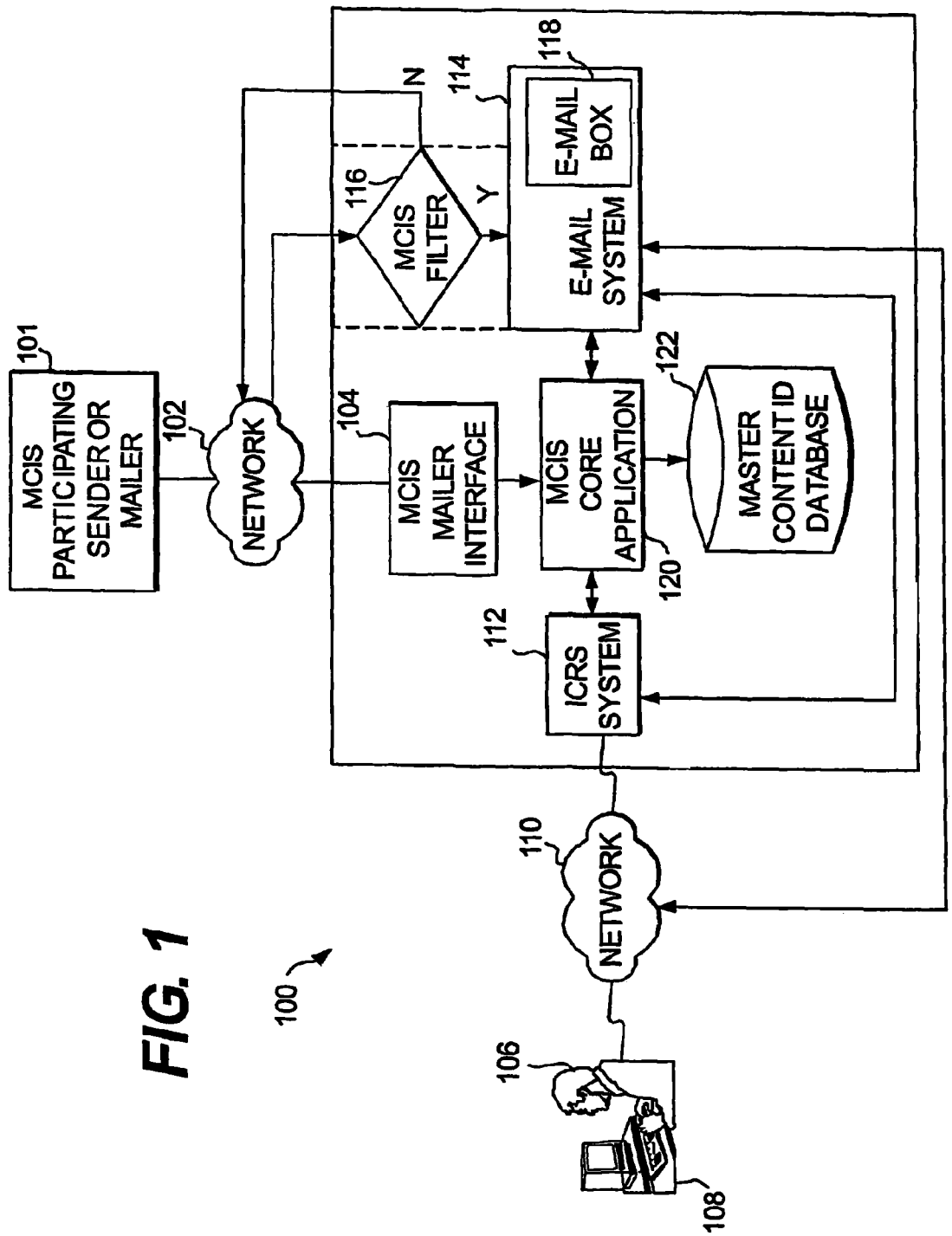
FIG. 1 is a layout of a system for providing electronic message identification consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

System Operation

FIG. 1 is an exemplary embodiment of a message content identifier system (MCIS system) 100 for a mail service. FIG. 1 illustrates a system layout where a mailer sends electronic messages directly to an e-mail system, in which system filtering takes place as a front end function of the e-mail system.

In FIG. 1, an MCIS participating sender or mailer (MPSM) 101 enters MCIS system 100 by registering with MCIS system 100. During the registration process, MPSM 101 is assigned a participant code or standardized content identifier for identification within MCIS system 100. The MCIS participant code, in addition to specifically identifying the industry segment of MPSM 101 and their company, identifies multiple permutations of product type codes or offering codes that are associated with the specific company, so that electronic messages sent by MPSM 101 to MCIS system 100 can be accordingly identified. Once the registration process is complete, these product codes are provided to MPSM 101, with the product type permutations, via some electronic communication; such as an e-mail. The registration process and the MCIS participant code structure and coding process will be described in greater detail below.

Before transmitting the electronic message, MPSM 101 embeds the MCIS participant code into the electronic messages that are generated and transmits the electronic messages through network 102 to MCIS Mailer Interface 104. Network 102 may be the internet or any type of analog or digital communications network. MCIS Mailer Interface 104 communicates with a core application 120 of MCIS system 100. Core application 120 interfaces e-mail system 114 and ICRS system 112 and allows the setup of MPSM 101 on e-mail system 114, using master content ID database 122. Master content ID database 122 contains the codes that core application 120 interrogates and stores for allocating the participant code to each MPSM 101, during the registration process.

To access the e-mail message transmitted by MPSM 101, a customer 106 must register with an e-mail system 114 of MCIS system 100. Using laptop 108, customer 106, through network 110, logs into an Internet customer registration system (ICRS system) 112. Network 110 may be the internet or any type of digital or analog communications network. With ICRS system 112, customer 106 registers and sets up the e-mail account by making selections for message filtering options. For additional information on ICRS system 112, please refer to U.S. application Ser. No. 09/809,328 filed on Mar. 16, 2001.

In this embodiment of the present invention, the filtering selection could occur when a customer registers or it could be an adjunct feature once the actual mailbox is established. When implemented as an adjunct feature, the filters may be set up within the mailbox itself rather than during the process of obtaining the mailbox.

Once MPSM 101 is registered as a participating mailer and customer 106 has signed up with MCIS system 100, then when MPSM 101 sends e-mail directly to the front end of e-mail system 114 via network 102 and MCIS filter 116, MCIS filter 116 checks the MCIS participant code against the preferences that the specific customer has indicated and executes appropriate routing.

At this point, MCIS filter 116 may either route the electronic message and deliver it to the customer's mailbox within e-mail system 114 or reject the electronic message and notify MPSM 101 that the message has been rejected. As a third option, MCIS filter 116 may deliver the electronic message into a generic pool instead of an identified specific MCIS filtered mail folder within the customer's mailbox. Customer 106 would then know that this electronic message did not meet the filtering criteria to be delivered to the mailbox, but it was sorted as it entered the box and was rejected. In any event, feedback is provided to MPMS 101 as notification of the outcome of the attempt, either successful or unsuccessful. Customer 106 then may enter his e-mail box 118 within e-mail system 114, using laptop 108 and network 110, and view the MCIS filtered electronic messages, non-filtered electronic messages, or another functional segments of the E-mail box 118.

Figure 2:
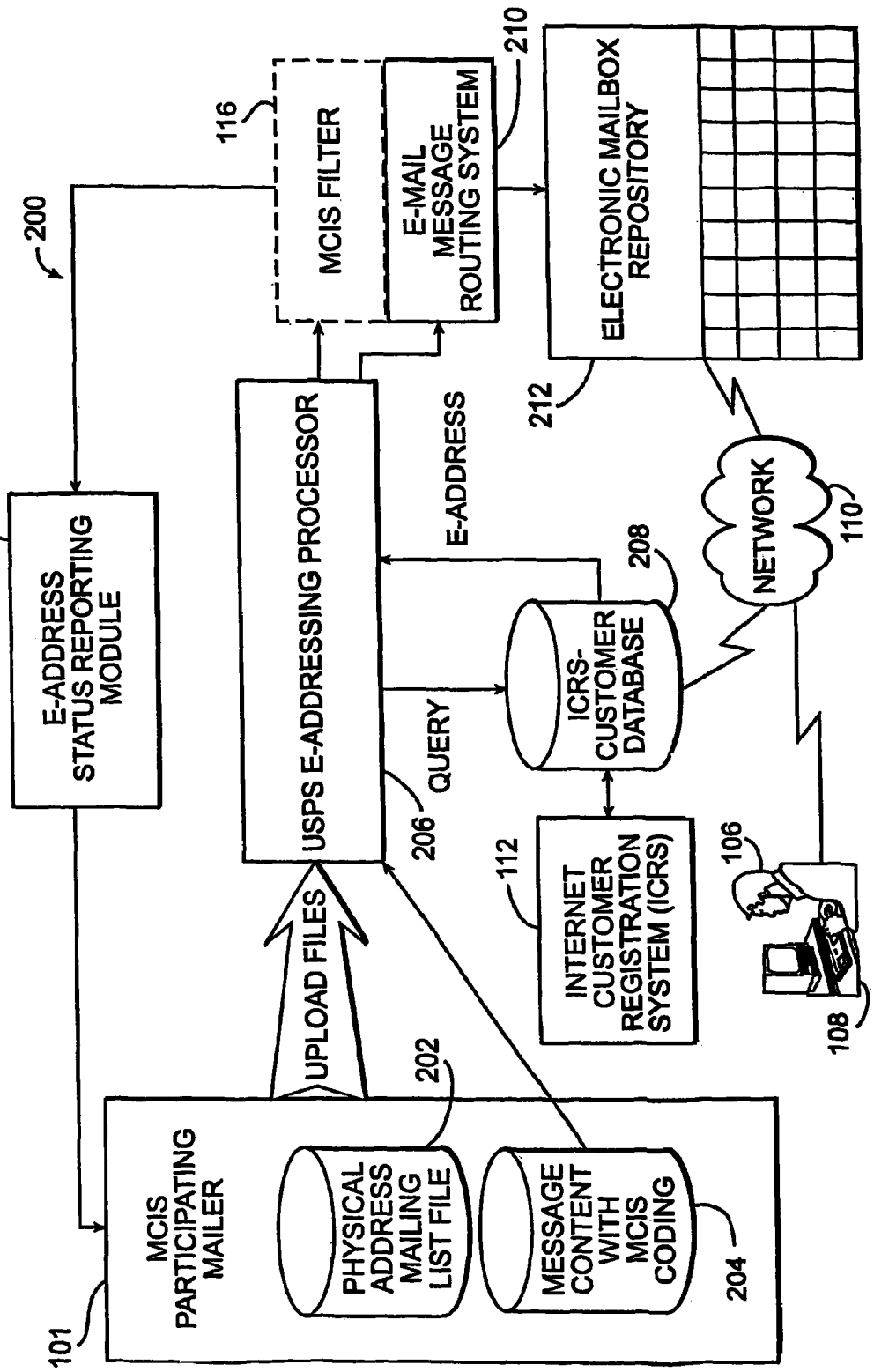
FIG. 2 is a layout of an alternative embodiment for providing electronic message identification consistent with the present invention.

FIG. 1 as previously described, focuses on the system layout and flow where the mailer is sending electronic messages directly or attempting to send electronic messages directly to customer 106. FIG. 2 is an alternative embodiment where MPMS 101 may submit electronic files containing physical addresses, and possibly electronic addresses, and message content that contains MCIS participant coding. The service provided by this alternative embodiment may be implemented as a separate intermediate service.

In this alternative embodiment, a physical address mailing list file 202 is uploaded, using a program, from MPMS 101 to an e-address processor 206. E-address processor 206 will be described in greater detail below. E-address processor 206 queries an ICRS customer database 208. As a result, ICRS customer database 208 outputs the customer's e-address and filtering preferences. ICRS customer database 208 contains the data supplied when customer 106 registered and set up the virtual e-addressing account with the mail service and initially recorded the filtering preferences.

The query executed by E-address processor 206 may be implemented by several different means. For example, the query may be based on the physical address, codes that are associated with the physical address, the customer's name, or account numbers associated with the customer. The query uses one or more of the above mentioned components to translate the physical address mailing list file 202 to an electronic address.

Furthermore, in this alternative embodiment, message content with MCIS coding 204 is also uploaded, using a program, to e-addressing processor 206, where the e-addressing information, message content and the MCIS coding are combined and the electronic message is created. The electronic message with the embedded coding is then sent to the MCIS filter 116 of FIG. 2, where the customer preferences are identified. The electronic message is subsequently sent into an e-mail message routing system 210 for delivery into electronic mailbox repository 212. Then, return statistics are sent to MPSM 101 via an e-address status reporting module 214.

Figure 3:
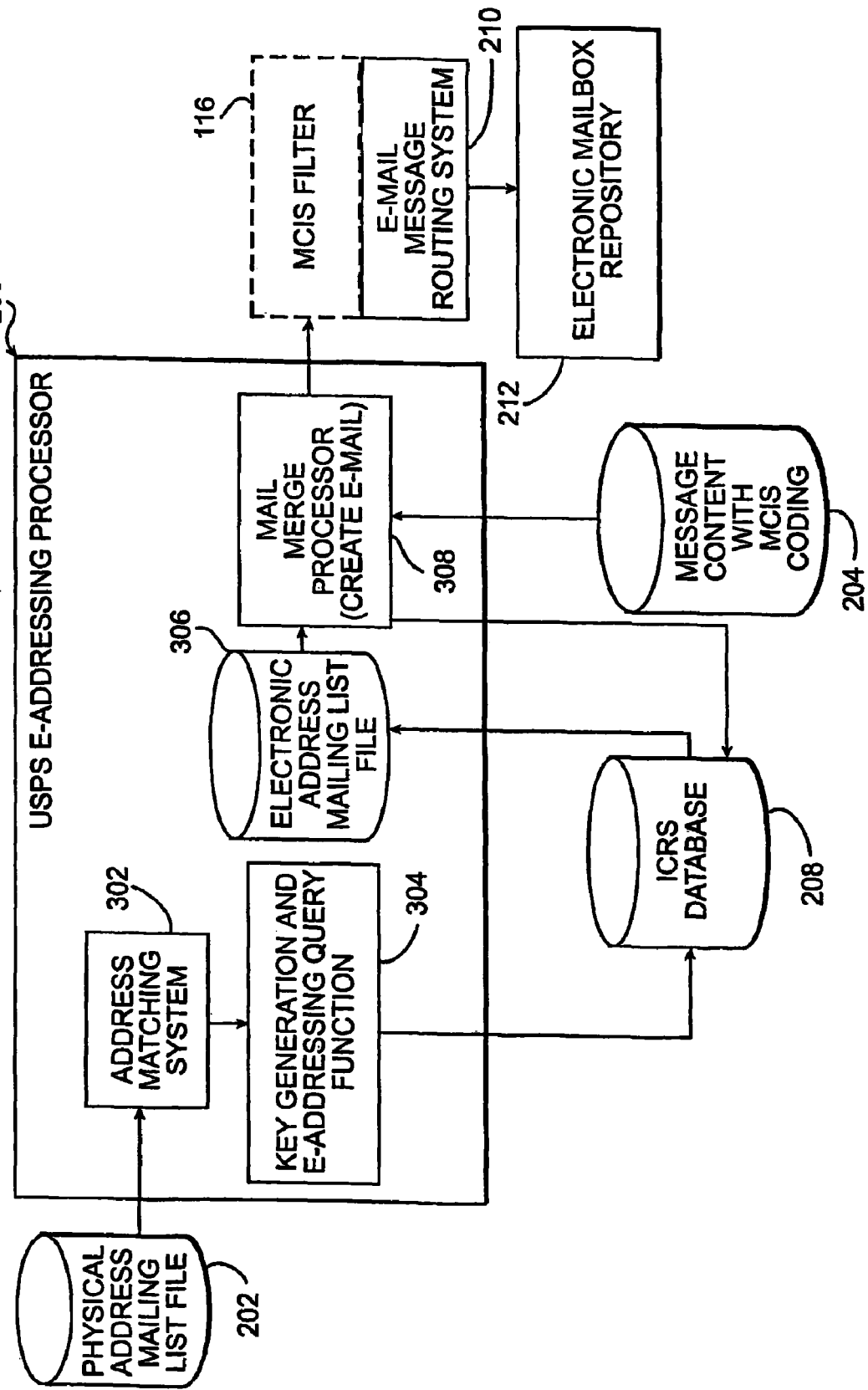
FIG. 3 is a block diagram of the internal processes of an e-address processor consistent with the present invention.

Before describing, in FIG. 3, the internal details of e-addressing processor 206, it is important to emphasize that the filtering executed by MCIS filter 116 may be implemented as part of the ICRS database query. Because the customer preferences may be stored on ICRS customer database 208, the filtering may take place as part of the querying process. The filtering process may also be implemented within e-address processor 206. The filtering process may be implemented in either fashion, that is, as part of the query of ICRS customer database 208, or by referencing back to the mail merge processor within e-address processor 206. The mail merge processor provides the function of creating the electronic message and will be discussed in the description of the internals of e-addressing processor 206.

In the case where the message filtering is performed during the querying of ICRS customer database 208, the e-mail message does not have to run through the entire system before the filtering may take place. Processing may occur at the ICRS customer database 208 to identify those customers that in fact will accept the message content. Using this approach, message routing/handling decisions may be made upstream versus downstream in the process, and the message may be delivered directly to the e-mail message routing system 210 for delivery into electronic mailbox repository 212.

FIG. 3 is a block diagram of the internal processes within the e-addressing processor 206. The numbers used in FIG. 3 correspond to the numbering system that is used in FIG. 2. FIG. 3 illustrates that physical address mailing list file 202 may be uploaded to an address matching system 302. In address matching system 302, the physical addresses are parsed and match codes are constructed for interrogating a match directory, within the address matching system, to obtain a match directory address associated with the input physical address. If a match is obtained, then the zip plus 4 code and all the other associated information contained within the address matching system for the associated physical address is fed into a key generation and e-addressing query function 304, which in turn feeds a query to ICRS customer database 208.

As a result of the database query, an output is provide from the ICRS customer database 208 to e-addressing processor 206. The output is an electronic address mailing list file 306, which is fed into a mail merge processor 308. Mail merge processor 308 receives message content with MCIS coding 204 and creates the electronic message. The resulting electronic message is then transferred to MCIS filter 116, where the customer preferences are identified. The electronic message is subsequently sent into e-mail message routing system 210 for delivery into electronic mailbox repository 212.

The intelligence from within mail merge processor 308 may be returned to the ICRS customer database 208 and messages may be tagged with appropriate routing information for historical information tracking.

MCIS Participating Sender or Mailer (MPSM) Processing

Figure 4:
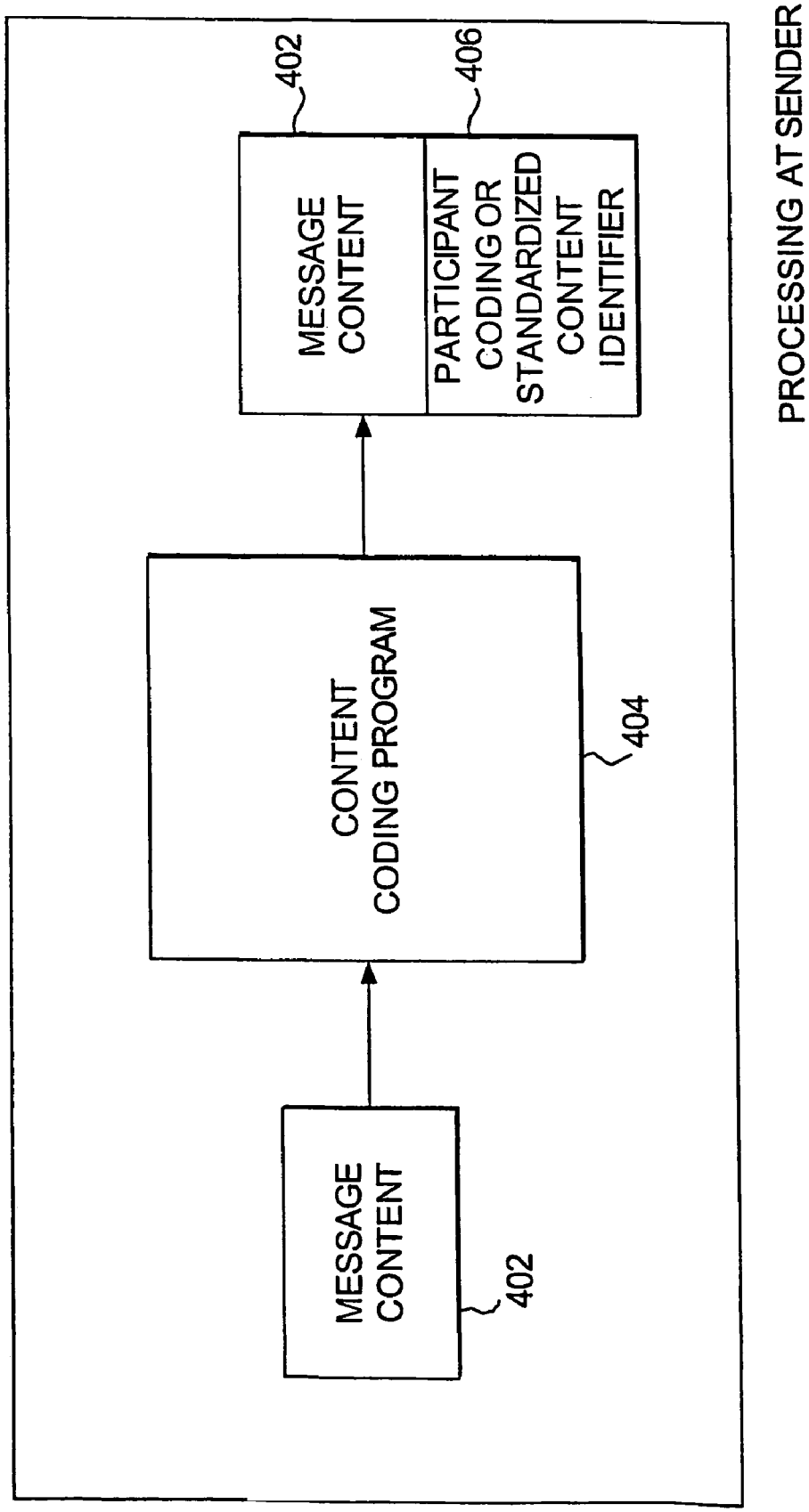
FIG. 4 is a block diagram illustrating the MCIS participant sender or mailer process to encode the electronic message content consistent with present invention.

FIG. 4 illustrates the process for applying the participant coding or standard content identifier to the message content. MPSM 101 inputs a message content 402 to a content coding program 404, where message content 402 is coded with a participant coding or standard content identifier 406. The participant code or standard content identifier may be inserted into the header section of an electronic message. Then, the electronic message is sent to E-mail system 114 via MCIS filter 116.

Figure 5:
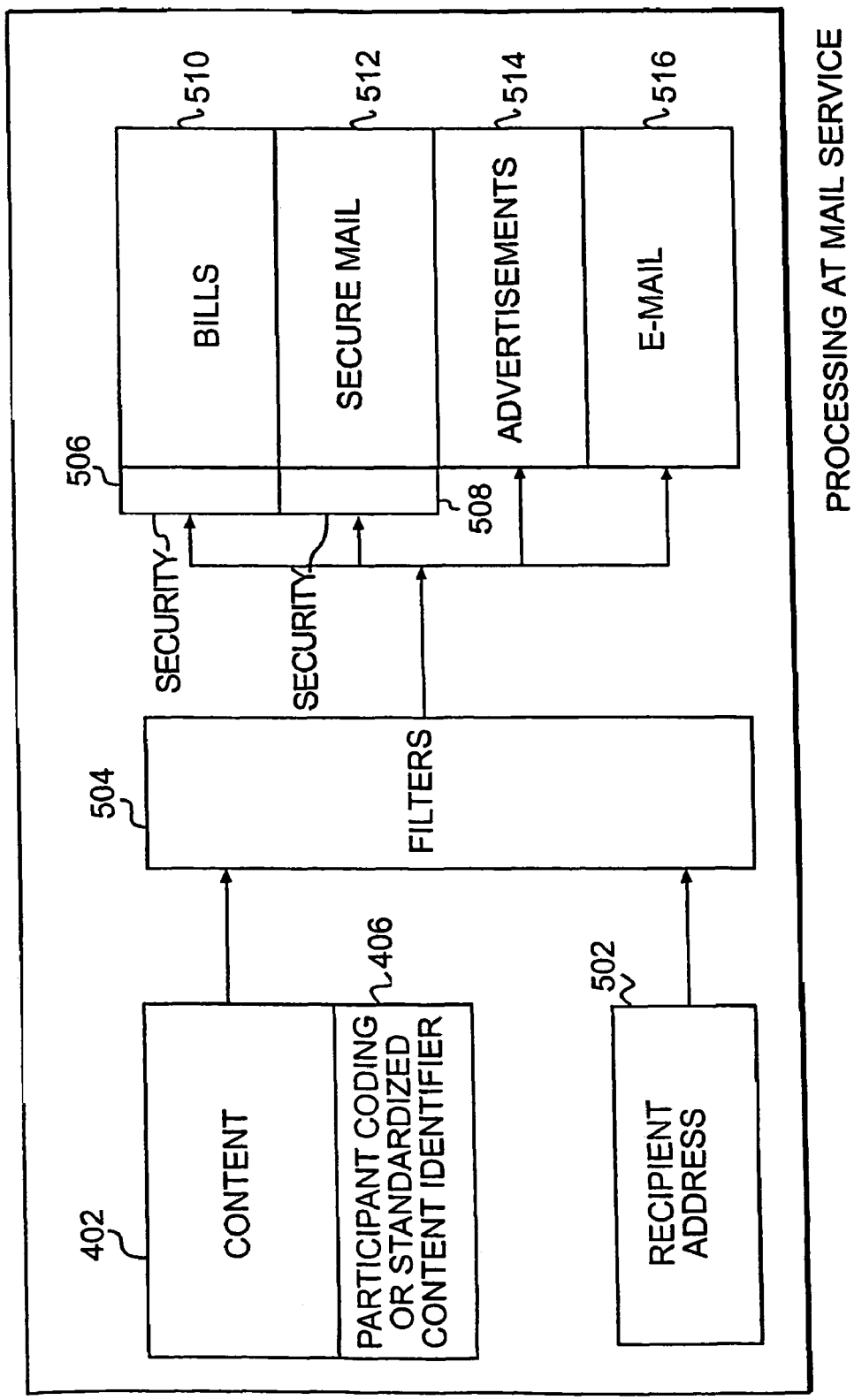
FIG. 5 is a block diagram illustrating the process for filtering and delivering the electronic message to an appropriate folder consistent with the present invention.

Next, FIG. 5 illustrates that the electronic message, including content 402, participant or standardized content identifier 406, and a recipient address 502, is received and submitted to filters 504. The recipient address 502 may be the customer's electronic mail box address. Filters 504, in turn, identify the customer's preferences, which were setup during the registration process, and apply the preferences to participant or standardized content identifier 406. Then, according to the identified preferences that are consistent with the participant or standardized content identifier 406, the electronic messages are delivered to the appropriate folders. For example, bills are delivered to a folder 510, secure mail may be delivered to a folder 512, advertisements may be delivered to a folder 514, and e-mail may be delivered to a folder 516. For additional security, security features 506 and 508 are applied before bills and secured mail are delivered to their appropriate folders. The security features (506 and 508) may be a type of electronic security message, protocol, or handshake used to distinguish between authorized and unauthorized system users. For example, the security features (506 and 508) may be a fire wall.

Participant Code or Standard Content Identifier

MCIS system 100 provides a standardized method for electronic messages and their content to be identified and subsequently filtered (accepted or rejected), based upon on the MCIS participant code or standardized content identifier 406. As described above, MCIS participating sender or mailer (MPSM) 101 is provided with content coding program 404 (FIG. 4) to provide associated product type identifiers that may be incorporated into MCIS system 100.

Once established as an MCIS system 100 participant, MPSM 101 provides this participant code or standardized content identifier 406 as part of all submitted messages for potential electronic delivery by the mail service or by other private commercial electronic message services licensed by the mail service to provide MCIS system messages to their customers.

The participant code or standardized content identifier may be implemented with the following MCIS code format:

NNNNNNAAAAAANNNNNNC
N=Numeric (0-9)
A=Alpha (A-Z)
C=Modulus 10 check digit

The MCIS code format is 18 characters in length plus a check digit and is divided into three segments:

I. The first six characters (NNNNNN) identify the industry segment and is based upon the North America Industry Classification System (NAICS);

II. The next six characters of the code (AAAAA) specifically identify a company within the industry segment and is based on the Address Change Service (ACS) participant code, which is describe in the publication of Appendix A (United States Postal Service, Address Change Service, Publication 8 (July 1998));

III. The last six characters (NNNNNN) are used to identify a specific product type or offering by a company;

IV. The last digit (C) is used to ensure the integrity or accuracy of the preceding 18 characters;

For example, the MCIS participant code or standardized content identifier may be 721191BRXJKT5011521. The component parts are:

I. 721191—the NAICS code that identifies the industry segment. for Bed-and-Breakfast Inns;

II. BRXJKT—identifies a specific Bed-and-Breakfast Inn (e.g., XYZ Bed-and-Breakfast in Anytown, USA);

III. 501152—identifies the contents of the messages as being an advertisement for discount offers for rooms booked 60 days in-advance for stays during the month of July;

IV. 1—identifies the check digit that ensures the integrity or accuracy of the preceding 18 characters.

Method of Operation

Figure 6:
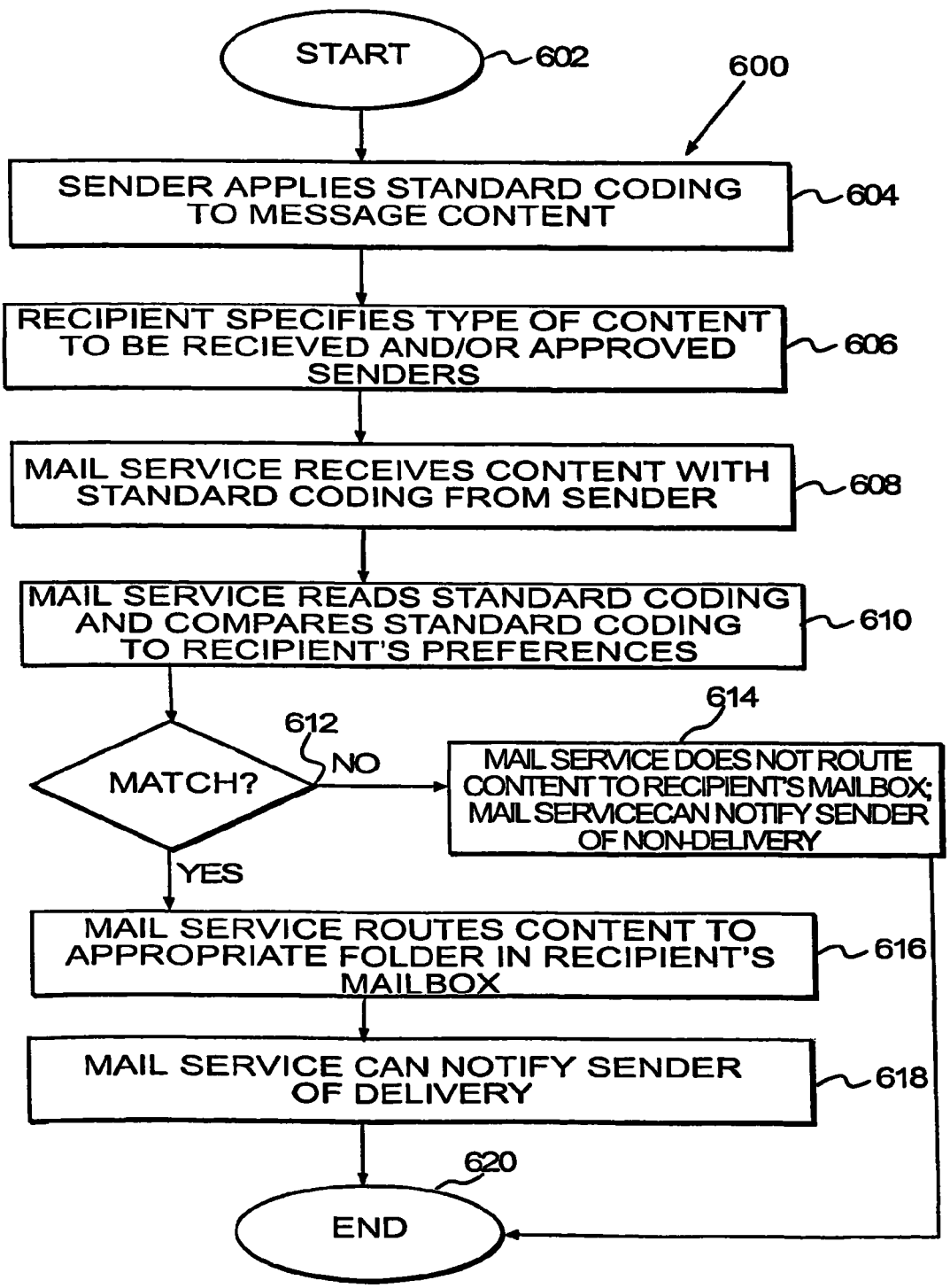
FIG. 6 is a flow chart illustrating a method for applying the participant code, identifying the electronic message content, and delivering the electronic messages consistent with the present invention.

FIG. 6 is a flow diagram of a method 600 used by MPSM 101 to send electronic messages to a recipient's mailbox. To initiate the transfer of information, method 600 starts, the sender applies a standard coding to the message content to be delivered to the recipient, and the recipient specifies the type of content to be received and/or identifies the approved senders. (Stage 602-606).

Once the mail service receives the content with the standard coding from MPSM 101, the mail service reads the standard coding and compares the standard code to the recipient's preferences (Stage 608). The recipient's preferences specify the content that the recipient wishes to receive and/or identifies the approved senders. (Stage 610). If the standard code from MPSM 101 is inconsistent with the recipient's preferences, the mail service does not route the message content to the recipient's mailbox, and may notify MPSM 101 of non-delivery. (Stage 614). Then, the method ends. (Stage 620).

If the standard code from MPSM 101 is consistent with the recipients specification, the mail service routes the content to the appropriate folder in the recipient's mailbox, and may notify the sender of the delivery. (Stage 616 and 618). Then, the method ends. (Stage 620).

In view of the foregoing, it will be appreciated that the present invention provides a system and method directed to identifying electronic messages based on a message content identifier or participant code. Still, it should be understood that the foregoing relates only to the exemplary embodiments of the present invention, and that numerous changes may be made thereto without departing from the spirit and scope of the invention as defined by the following claims.

We claim:

1. A method for sending an electronic file to a customer, comprising:

receiving, at a processor, a first electronic file containing a physical address list comprising a physical address;

receiving, at the processor, a second electronic file containing file content and a content identifier code at the processor, the content identifier code comprising a concatenated string including an industry segment identifier string, a company identifier string, a product-type identifier string, and a message integrity string;

extracting the physical address from the first electronic file;

prior to creating a third electronic file comprising the message content, querying a customer database based on the extracted physical address to retrieve a customer's e-address and content filtering preferences associated with the physical address;

comparing the content identifier code to the content filtering preferences;

associating the content identifier code with message routing information;

storing the message routing information in the customer database for historical tracking;

if the content identifier code is consistent with the content filtering preferences, then combining the customer's e-address and file content to create the third electronic file for delivery to the customer and sending the third electronic file to an electronic mailbox associated with the customer's e-address; and if the content identifier code is inconsistent with the content filtering preferences, not routing the file content to the customer.

2. The method of claim 1, further comprising sending the third electronic file to a filter for identification of customer preferences.

3. The method of claim 2, further comprising:
sending the third electronic file to a routing system for delivery to an appropriate folder in the customer's electronic mailbox, and notifying a sender of the file content that the file content has been delivered.

4. The method of claim 3, wherein the electronic mailbox of the customer is stored in an electronic mailbox repository containing a plurality of electronic mailboxes.

5. The method of claim 2, further comprising:
comparing the content identifier code to the customer preferences and, if the content identifier code is inconsistent with the customer preferences, sending the third electronic file to a pool folder.

6. The method of claim 2, further comprising:
comparing the content identifier code to the customer preferences, and if the content identifier code is inconsistent with the customer preferences, marking the file content as undeliverable, and notifying the sender of the file content that the file content is undeliverable.

7. The method of claim 1, wherein the third electronic file comprises an e-mail message.

8. A system for composing and delivering an electronic message to a customer, comprising:
a component for uploading a first electronic file containing a physical address mailing list file comprising a physical address, and a second electronic file containing message content and coding, the message coding comprising a concatenated string including an industry segment identifier string, a company identifier string, a product-type identifier string, and a message integrity string;
an extracting component for extracting the physical address from the physical address mailing list file;
a content filter that, prior to a creation of an electronic message comprising the message content, filters the message content and coding to determine whether the message content is consistent with a customer's content filtering preferences;
a processor that receives the uploaded physical mailing list file and message content and coding, queries a database for an e-address and the customer's content filtering preferences associated with the physical address, and if the content filter determines that the message content is consistent with the customer's content filtering preferences, then creates the electronic message;
an associating component that associates the message coding with message routing information;
a storing component that stores the message routing information in the database for historical tracking; and
a message routing system that, if the message content is consistent with the customer's content filtering preferences, receives the message content and coding that has been successfully filtered and delivers the electronic message to a customer electronic mailbox and, if the message content is inconsistent with the customer's content filtering preferences, does not route the electronic message to the customer electronic mailbox.

9. The system of claim 8, wherein the content filter is located within the processor and filters the message content and coding before forwarding the electronic message, which has been developed from a successfully filtered message content and coding, to the message routing system.

10. The system of claim 9, wherein a notification is provided indicating successful delivery to the message routing system.

11. The system of claim 8, wherein the content filter is located in the database and the filtering takes place as part of the query.

12. The system of claim 8, wherein an unsuccessfully filtered message content and coding is one of delivered to a pool and undelivered.

13. The system of claim 12, wherein a notification is provided indicating one of unsuccessful delivery to the message routing system and delivery to a pool.

14. A system, including a processor, for sending an electronic file to a customer, comprising:
an address matching component that parses a physical address from a first electronic file containing a physical address list comprising the physical address and constructs match codes for interrogating a match directory within the address matching component;
a key generation querying component that receives results from the address matching component, based on the interrogation of the match directory, and queries a database to obtain an electronic address list file and customer content preferences;
a content filtering component that receives a second electronic file containing a message and a message content identifier and, prior to a creation of a third electronic file comprising the message, filters the second electronic file based on the message content identifier to determine whether the message is consistent with the customer content preferences, the message content identifier comprising a concatenated string including an industry segment identifier string, a company identifier string, a product-type identifier string, and a message integrity string;
a mail merge processor that, after the second electronic file has been filtered based on the message content identifier, (i) receives the electronic address list file, (ii) receives the message and the message content identifier, and (iii) creates the third electronic file based on the received message and electronic address list file if the content filtering component determines that the message content identifier is consistent with the customer content preferences;
an associating component that associates the message content identifier with message routing information;
a storing component that stores the message routing information in the database for historical tracking; and
a routing component that, if the message content identifier is consistent with the customer content preferences, delivers the third electronic file that has been successfully filtered to the customer's e-mail account and, if the message content identifier is inconsistent with the customer content preferences, does not deliver the message to the customer.

15. The system of claim 14, wherein a notification is provided indicating successful delivery of the third electronic file to the customer's e-mail account.

16. The system of claim 14, wherein an unsuccessfully filtered message is one of delivered to a pool and undelivered.

17. The system of claim 16, wherein a notification is provided indicating one of unsuccessful delivery to the message routing system and delivery to a pool.

18. The system of claim 14, wherein the third electronic file comprises an e-mail message.

* * * * *